United States Patent

Hammer

4,062,624

Dec. 13, 1977

[54] CONNECTOR FOR OPTICAL FIBRE

[75] Inventor: Alfred Paul Hammer, Paris, France

[73] Assignee: Thomson-CSF, Paris, France

[21] Appl. No.: 635,775

[22] Filed: Nov. 26, 1975

[30] Foreign Application Priority Data

Nov. 29, 1974  France .................. 74.39189

[51] Int. Cl.² ................................. G02B 5/14
[52] U.S. Cl. .................................... 350/96 C
[58] Field of Search ............... 350/96 C, 96 B, 96 R

[56] References Cited

U.S. PATENT DOCUMENTS

| B408,380 | 1/1975 | Miller | 350/96 C |
|---|---|---|---|
| 3,864,018 | 2/1975 | Miller | 350/96 C |
| 3,944,328 | 3/1976 | Kent et al. | 350/96 C |

FOREIGN PATENT DOCUMENTS 1,111,419  4/1968  United Kingdom ........... 350/96 B

Primary Examiner—John K. Corbin
Assistant Examiner—Stewart Levy
Attorney, Agent, or Firm—Cushman, Darby & Cushman

[57] ABSTRACT

A connector for connecting two optical fibres comprising two bunches of six flexible rods having the same diameter as the fibre and assembled together tangentially, in order to center each of the two optical fibres which are to be connected together, by insertion along the axis of each bunch, the two fibres being secured in position by clamping each bunch by a concentric ring.

9 Claims, 6 Drawing Figures

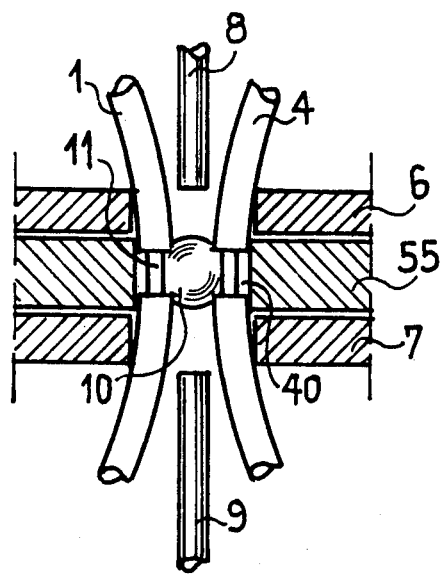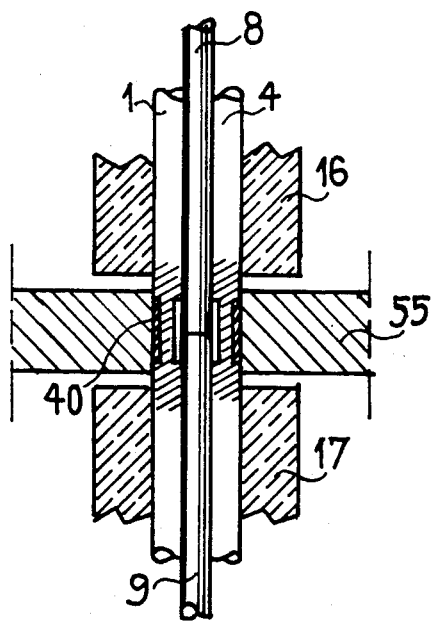

CONNECTOR FOR OPTICAL FIBRE

The present invention relates to connectors designed to effect connection between two guide arrangements designed to guide light in a dielectric medium, and known by the name of "optical fibres".

One known optical fibre has a generally cylindrical structure, and is made of two coaxial media having different refractive indices, respectively an internal one, known as "core", an external one known as "cladding layer".

Depending upon the mode of propagation of the light through the core, the diameter of such a fibre will vary between 1 and $2\mu$ in the case of "monomode" propagation, and between 20 and $100\mu$ in the case of "multimode" propagation, whilst the external diameter of the external cladding layer depends primarily upon operating requirements such as flexibility, and is typically of the order of 50 to $120\mu$; the variation in refractive index, between core and cladding layer, may be either sudden or progressive.

Satisfactory connection of two cylindrical optical fibres having the same geometrical and optical characteristics, requires a connector which will ensure the following two results:
geometric coincidence of the base circles;
contact between the base surfaces.

In view of the order of magnitude of the diameters of the optical fibres, a precision of the order of microns is required where alignment is concerned, and this is something which known connectors cannot achieve, except at the expense of very highprecision manufacturing process steps, which are extremely expensive and difficult to put into effect.

A structure in accordance with the invention is based upon a geometric property of tangent circles, in accordance with which six circles of the same diameter, tangent with one another in pairs, have a common inscribed circle of the same diameter.

If the circles respectively represent the sections of an optical fibre and of six wires of the same diameter surrounding it, it is possible to effect precision centring of an optical fibre by introducing it into a bunch of six strands or wires secured together over a part at least of their length.

More precisely, the invention relates to a connector for connecting two optical fibres, which comprises means for centring the free end of each fibre, and capable of acquiring two states, respectively open and closed, wherein said means are constituted by a bunch of six cylindrical rods, made of an elastic material, and having the same diameter as the fibres, said rods in the bunch being connected, tangentially in relation to one another, and at one of their ends, to an annular support, clamping means, constituted by a mobile sleeve concentric with the axis of the bunch, being provided in order to effect closing.

The invention will be better understood from a consideration of the ensuing description, and by reference to the attached figures where:

FIG. 3 illustrates a variant of said first embodiment, comprising an intermediate chamber for liquid;

FIG. 4 illustrates another variant, in which clamping is effected by thermo-shrinking sleeves;

FIG. 1 illustrates an explanatory diagram comprising six circles of the same diameter A, in a tangential relationship around an inscribed circle B.

The laws of geometry show that these circles define an inscribed circle of their own diameter. If the circles, viewed in right section, constitute the external contours of six cylindrical rods or wires, then it will be seen that a wire of the same diameter introduced at the center of FIG. 1, the inscribed circle representing the external contours thereof, viewed in right section, is positioned in a unique manner in relation to the assembly of the bunch of six rods or wires circumscribing it.

A bunch of this kind, if fixed to a support, thus makes it possible to accurately define the position of the axis of the centre wire and accordingly performs a centring function in application.

On the other hand, if the rods or wires of the bunch are only connected to one another at one of their ends, and are left free at the other, then the bunch will acquire a general hollow structure of conical form, the apex corresponding to the connection between the ends, and the large, open base, to the free ends; simple insertion of the central wire into the bunch is thus made possible by introducing it into the open part of the base of the bunch. The bunch thus has a second function, that of guidance at the time of introduction.

Finally, the application of a centripetal external force to the rods of the bunch, causes pinching or clamping of the central wire which is thus secured to the support, and accordingly makes it possible to accurately define the longitudinal position of the central wire, this constituting a third function, that of clamping, in application. In the following part of the description, by way of example, several methods of applying the centripetal clamping force will be disclosed.

Figure 2:
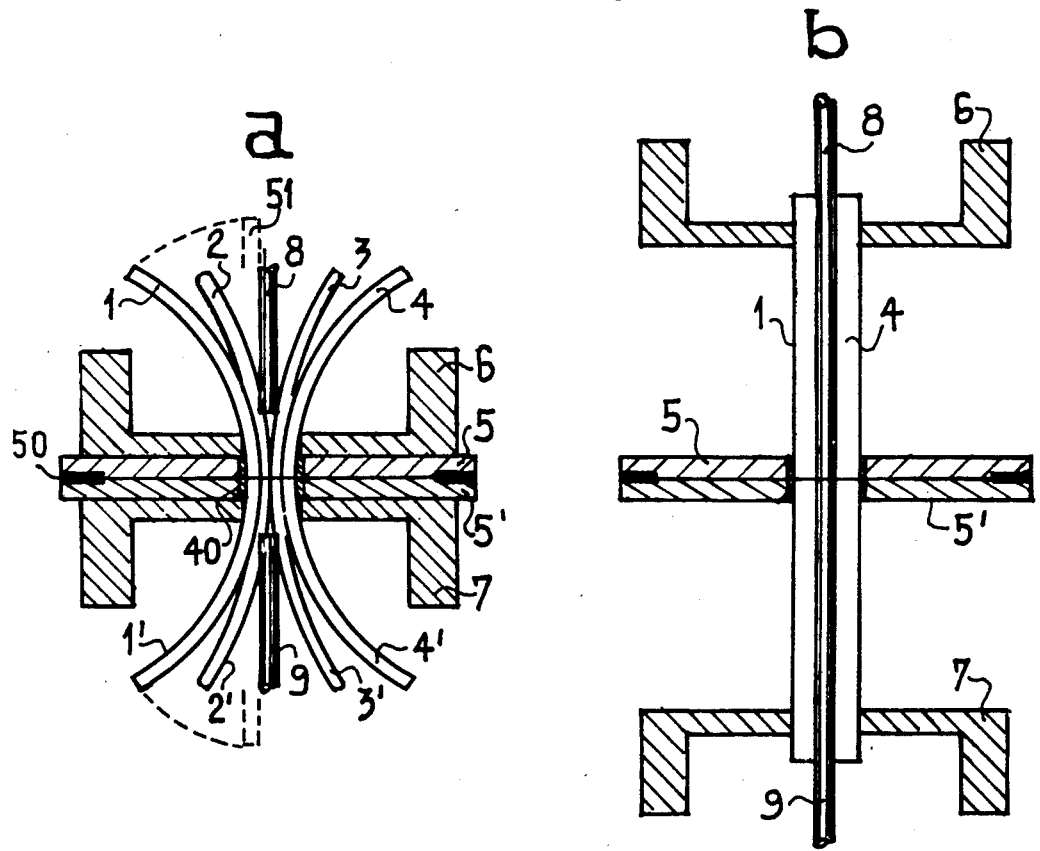
FIG. 2 illustrates a first embodiment of the connector in accordance with the invention, between two bare optical fibres.

FIG. 2, in parts (a) and (b), illustrates the first embodiment, in accordance with the invention, of a connector for use between two optical fibres and utilizing two bunches of the kind described hereinbefore.

The rods, wires or strands or a first bunch, which are characteristic of the invention, only four of these, 1, 2, 3, 4 having been shown in FIG. 2(a) in order not to overburden the illustration, are attached by sticking, welding or metallising to a ring 5 at 40.

Similarly, the six strands of a second bunch, as for example 1', 2', 3' and 4' are attached to a ring 5'.

The two rings 5 and 5' are connected together by a weld ring 50.

Strands can be made of any materials (metals, plastic material) having optimum surface mechanical properties (hardness, elasticity) in order to exert a pressure on glass without damaging it; phosphor-bronze coated with a layer of a soft metal such as tin, or again nylon, can advantageously be used in this context.

The wires have been given a curvature which gives them an overall form, when the connector is the open position, of a double cone or bellmouth. On the other hand, two mobile rings 6 and 7 surround the bunch of strands and are shown in contact in FIG. 2a. The flared form of the two bunches then enables easy guided insertion to be effected of the two optical fibres 8 and 9 which are to be connected.

FIG. 2(b) illustrates the connector after connection, in the closed position.

Figure 1:
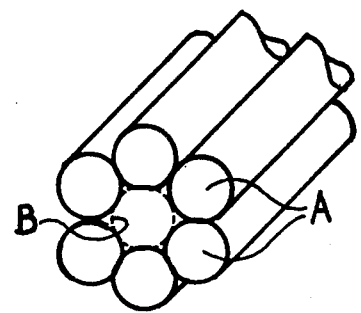
FIG. 1 illustrates an explanatory diagram comprising six tangenting circles around an inscribed circle.

The mobile rings 6 and 7 have been moved apart, and clamp the strands of the two bunches, the clamping force being transmitted to the optical fibres and securing them in position so that in section the view shown in FIG. 1 is produced; the clamping length may typically be of the order of 100 times the diameter of the optical fibres. To improve clamping, a bead can be provided on part of each strand, by any known method, in order to increase its diameter within suitable limits. The precision of alignment of the axes of the two fibres which are being connected, depends upon that with which the strands are made themselves, and this latter precision is extremely high where known methods of production are concerned.

In practical implementation the two rings 5 and 5' can be constituted by a single common ring; similarly, the fibres of the two bunches can be constituted by integral fibres fixed together at their central zone.

FIG. 3 illustrates a special variant embodiment of the connector shown in FIG. 2, which ensures good optical transmission at the location of the connector, without requiring any physical contact between the mutually opposite terminal faces of the optical fibres, or any precision surface finishing of the whole of their sections.

To achieve this, a chamber is formed in the region of connection of the fibres, into which a certain quantity of liquid 10 having the same refractive index as the cones of the fibres is introduced, being held there by capillary action. A chamber can advantageously be formed by thinning 11 each strand, and the liquid may for example be butadienehexachloride or tetrachlorethylene.

FIG. 4 illustrates another variant embodiment of the connector shown in FIG. 2, where the function of the two mobile clamping rings 6 and 7 are performed by two plastic sleeves 16 and 17 made of material known as "thermo-shrinking" plastic.

They have an internal diameter larger than that of the open bunch and can readily be assembled in position during the first phase of establishment of the connection. The sleeves are then heated, for example by directing a hot air-flow over them, so that they shrink, and clamp the bunch of strands in position on the optical fibres, so that the final position shown in FIG. 4 is produced. The connection is then complete.

Figure 5:
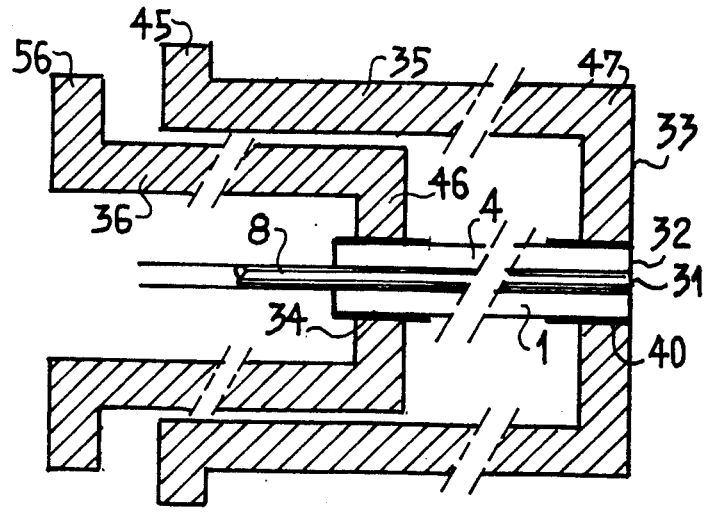
FIG. 5 illustrates a terminal plug for an optical fibre in accordance with the invention.

FIG. 5 illustrates, in another embodiment of the connector in accordance with the invention, a mobile plug which can in particular be employed to produce an immediate connection between two such plugs.

In accordance with this embodiment, the bunch of strands, such as those 1 and 4, associated with the fibre 8, extend at only one side of the support in the form of a ring 47, where the strands are fixed in position by a metallising layer 40; the ring 47 has a connecting face 33 at which the terminal faces, such as those 32, of the strands, appear, as also does the terminal face 31 of the optical fibre 8; this set of faces will advantageously have been precision surface-finished or polished; the ring 47 is integral with a tubular component with a cylindrical lateral surface 35, terminating in a projecting finger-grip ring 45.

The mobile ring 46 clamps the strands such as 1 and 4, onto the optical fibre 8; it is integral with a tubular component 36 terminating in a projecting finger-grip ring 36. A bead such as that 34 carried by the strands, helps to improve the clamping effect.

Figure 6:
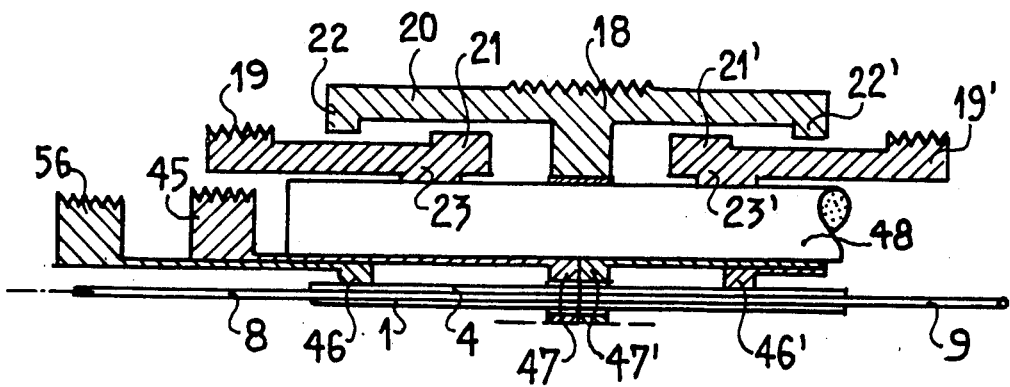
FIG. 6 illustrates a second embodiment of the connector with the invention, between two optical fibres each equipped with the plug shown in FIG. 5.

FIG. 6 illustrates a connector designed to connect two mobile plugs such as those described hereinbefore an illustrated in FIG. 5.

The connector employs two of these plugs, which have been illustrated only fragmentarily in order not to overburden the drawing, the references pertaining to the similarly numbered elements of FIG. 5.

The connector comprises a fixing ring 18 equipped at the exterior with a finger-grip barrel 20, inside which six strands such as those 48 are fixed by their central portions, so that at either side of the ring a bunch identical to the ones used in the embodiments described earlier, is created. The strands of each bunch bear against the cylindrical part 35 and 35' of each mobile plug and, in order to produce the centring of the two plugs under conditions identical to those indicated in the description of FIG. 1, have the same diameter as said cylindrical portions. Two mobile rings, 23 and 23', clamp the bunches to the plugs and consequently secure them in position.

The displacements of the clamping rings are limited by mobile stops such as 21 and fixed stops such as 22, and are facilitated by knurled projecting finger-grip rings such as those 19 and 19'.

Although the shape of the faces of the rings 47 and 47' lends itself to accurate polishing of their mutually opposite surfaces, the introduction between these faces of a layer of liquid having the same refractive index as the axial part of the fibres, forms part of the present invention.

The utilization of six-strand bunches in order to centre the mobile plugs, thus conserves the precision attained by the six-strand bunches which are responsible for centring the optical fibres themselves.

Of course, the invention is not limited to the embodiments described and shown which were given solely by way of example.

What is claimed is:

1. A connector for connecting two optical fibres, comprising means for centering the free end of each fibre wherein said means are constituted by a bunch of six cylindrical rods made of an elastic material and having the same diameter as the fibres, said rods in the bunch being connected, tangentially in relation to one another and at one of their ends, to an annular support clamping means constituted by a mobile sleeve concentric with the axis of the bunch, being provided in order to effect closing.

2. A connector as claimed in claim 1, wherein said rods of the bunch are divergent in the open state and are substantially parallel in the closed state.

3. A connector as claimed in claim 1, wherein said concentric sleeve is constituted by a thermoshrinking material.

4. A connector as claimed in claim 1, wherein said rod contain undercut at the level of the annular support, designed to accomodate a quantity of a liquid having a refractive index of the same order of magnitude as that of the core of an optical fibre.

5. A connector as claimed in claim 1, wherein said rods present a bead over part of their length, opposite to said end.

6. A connector as claimed in claim 1, wherein is comprised means for assembling two of said centering means at the free end of each optical fibre.

7. A connector as claimed in claim 6, wherein said assembly means are constituted by two supplementary bunches of six cylindrical rods, having the same diameter as each annular support, made of an elastic material, and connected in a tangential relationship with one another to a single assembly support, at one of their ends.

8. A connector as claimed in claim 6, wherein said assembly means are constituted by a combination into a common support, of said two annular supports upon which said rods of each two bunches are linked together by their said ends.

9. A connector as claimed in claim 8, wherein each of the six rods of one of the bunches, is formed integrally with one of the six rods of the other bunch.

* * * * *